(12) United States Patent
Sakamoto et al.

(10) Patent No.: US 12,265,311 B2
(45) Date of Patent: Apr. 1, 2025

(54) ELECTRO-OPTICAL DEVICE

(71) Applicant: Nippon Telegraph and Telephone Corporation, Tokyo (JP)

(72) Inventors: Takashi Sakamoto, Tokyo (JP); Yuichi Akage, Tokyo (JP); Masahiro Ueno, Tokyo (JP); Sohan Kawamura, Tokyo (JP); Soichi Oka, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 273 days.

(21) Appl. No.: 17/918,721

(22) PCT Filed: Apr. 16, 2020

(86) PCT No.: PCT/JP2020/016788
§ 371 (c)(1),
(2) Date: Oct. 13, 2022

(87) PCT Pub. No.: WO2021/210145
PCT Pub. Date: Oct. 21, 2021

(65) Prior Publication Data
US 2023/0236470 A1 Jul. 27, 2023

(51) Int. Cl.
*G02F 1/29* (2006.01)
*G02F 1/03* (2006.01)

(52) U.S. Cl.
CPC .............. *G02F 1/29* (2013.01); *G02F 1/0327* (2013.01)

(58) Field of Classification Search
None
See application file for complete search history.

(56) References Cited

U.S. PATENT DOCUMENTS

| | | | |
|---|---|---|---|
| 5,943,350 A | * | 8/1999 | Shichijyo ................ H01S 3/109 372/99 |
| 2011/0058166 A1 | * | 3/2011 | Nakamura ............ G01J 3/0237 356/326 |
| 2017/0358899 A1 | * | 12/2017 | Toyoda ................... H01S 5/143 |

FOREIGN PATENT DOCUMENTS

| JP | S63170982 A | 7/1988 |
|---|---|---|
| JP | H1055005 A | 2/1998 |
| JP | 2015158531 A | 9/2015 |
| JP | 2017203847 A | 11/2017 |

* cited by examiner

*Primary Examiner* — Ryan Crockett
(74) *Attorney, Agent, or Firm* — Slater Matsil, LLP (57) ABSTRACT

An electro-optical device includes an electro-optic crystal, a first electrode, and a second electrode. A voltage is applied to the electro-optic crystal by the first electrode and the second electrode. The electro-optic crystal has an incident surface and an emitting surface parallel to each other and deflects incident light made incident on the incident surface at an acute incident angle in an electric field direction in which a voltage is applied. A rotation axis of an incident angle is parallel to the electric field direction.

12 Claims, 9 Drawing Sheets

ELECTRO-OPTICAL DEVICE

CROSS-REFERENCE TO RELATED APPLICATIONS

This application is a national phase entry of PCT Application No. PCT/JP2020/016788, filed on Apr. 16, 2020, which application is hereby incorporated herein by reference.

TECHNICAL FIELD

The present invention relates to an electro-optical device composed of an electro-optic crystal.

BACKGROUND

Optical deflectors that scan the irradiating positions of light beams have been used in various fields such as laser printers and wavelength sweeping light sources. As a typical optical deflector, a galvano scanner is used. The galvano scanner is configured to have a mirror mounted on a component such as a motor that mechanically drives. The optical deflector of this type has a limited scanning frequency due to the operating frequency of a component such as a motor, and its upper limit operating frequency is generally several kHz to several tens of kHz at most.

Meanwhile, in recent years, the research and development of electro-optic elements using KTN ($KTa_{1-x}Nb_xO_3$) or KLTN ($K_{1-y}Li_yTa_{1-x}Nb_xO_3$) crystals characterized by having a greater Kerr effect representing a secondary electro-optic effect than other electro-optic crystal materials have been actively advanced. Hereinafter, KTN and KLTN will be collectively shown as KTN when they are not required to be distinguished from each other. As one of electro-optic elements using KTN, an optical deflector (KTN optical deflector) is attracting attention (see PTL 1).

The KTN optical deflector has no component that mechanically operates unlike the optical deflector described above that is based on a mechanical operation, but controls the refractive index of a KTN crystal with a voltage to realize beam scanning. The KTN optical deflector is characterized by 1) speeding up with an operating frequency of up to a MHz order is allowed, 2) miniaturization is allowed since no motor is required, 3) the realization of a great deflection angle is allowed as an optical deflector using an electro-optic effect, 4) the simplification of an optical design is allowed since the KTN optical deflector is a transmission type device in which light deflects while passing through a KTN crystal unlike a reflection type using a mirror, or the like.

As a typical structure, the KTN optical deflector includes a KTN crystal formed into a rectangle shape and a pair of electrodes formed on the respective surfaces of the KTN crystal that face each other. When a DC voltage is applied to the KTN crystal, electrons are injected and accumulated in a trap inside the crystal. These electrons form an electric field distribution in an electric field direction inside the crystal. When an AC voltage is superimposed on the KTN crystal in this state, an external electric field is further added and a refractive index distribution is formed in the electric field direction inside the crystal by an electro-optic effect (Kerr effect). Along a light axis substantially perpendicular to the electric field direction, a light beam is made incident. Since the refractive index distribution in the electric field direction changes with a voltage, the light beam made incident on the KTN crystal changes its traveling direction due to a control voltage. That is, scanning with the light beam is allowed by the control voltage.

CITATION LIST

Patent Literature

[PTL 1] Japanese Patent Application Laid-open No. 2017-203847.

SUMMARY

Technical Problem

Figure 7A:
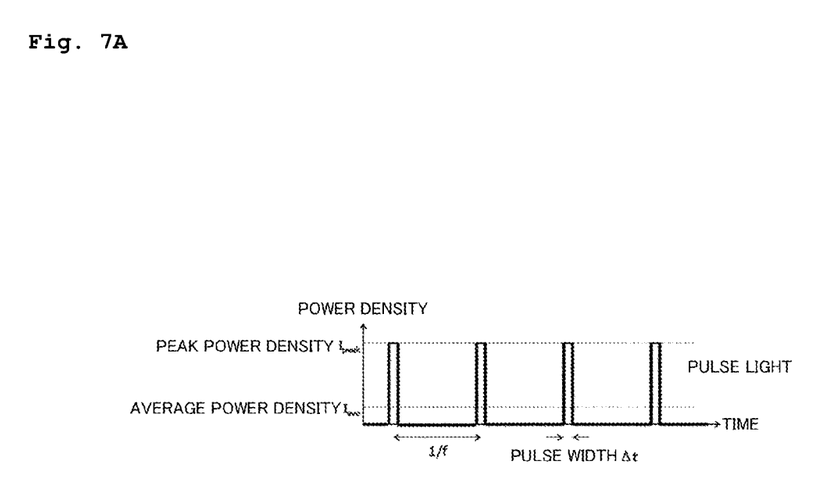
FIG. 7A is a characteristics diagram showing a change in power density with time when a laser is a pulse light source.

Generally, an optical element has an upper limit on the power density of a laser, which is capable of being made incident, so as not to cause damage. Here, the power density represents one obtained by dividing laser power P by a beam area. It is assumed that a beam diameter (diameter) is d. A beam area S is expressed as shown in the following Formula (1) when a beam shape is a circle. A case in which the laser is a pulse light source is shown in FIG. 7A. Average power density $I_{ave}$ is expressed as shown in the following Formula (2) when it is assumed that the average laser power of the laser is $P_{ave}$. Further, peak power density $I_{peak}$ is expressed as shown in the following Formula (3) when it is assumed that the repetition frequency of the laser is f and a pulse width is $\Delta t$.

$$S = \pi \left(\frac{d}{2}\right)^2 \quad (1)$$

$$I_{ave} = \frac{P_{ave}}{S} \quad (2)$$

$$I_{peak} = \frac{I_{ave}}{f \Delta t} \quad (3)$$

Figure 7B:
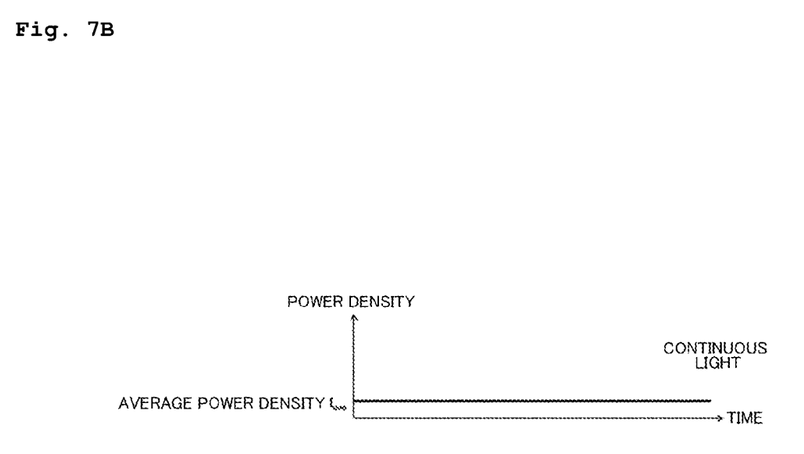
FIG. 7B is a characteristics diagram showing a change in power density with time when the laser is a continuous light source.

Further, a case in which the laser is a continuous light source is shown in FIG. 7B. Since laser power is constant in time, the power density of the laser is also constant in time. For the unification of terminology between the case of the pulse light source and the case of the continuous light source, the power density of the laser will be called average power density below.

The mechanism of breakage can be different depending on whether the laser is the pulse light source or the continuous light source. Further, even when the laser is the pulse light source, the mechanism of breakage can be different if the repetition frequency of a pulse or a pulse width is different. However, it has been known that the laser power per unit area (that is, the peak power density or the average power density) is generally an important parameter regardless of the mechanism of breakage.

For example, in a galvano scanner, a mirror is required to have a greater size than a beam. However, if the beam diameter of a laser is increased to reduce power density for the purpose of preventing breakage, the size of the mirror increases. A load on a motor increases with an increase in the size of the mirror. As a result, the mirror is not allowed to operate at a high frequency.

When a KTN crystal is used in a light beam scanner, the light of the power density of a laser that does not cause damage is also required to be made incident like a conventional optical deflection element or an optical material. However, when a beam shape is, for example, a circle, the distance between a pair of electrodes formed on the respective surfaces of the KTN crystal that face each other is required to be increased with an increase in a diameter. That is, the thickness of the crystal is required to be increased.

Since the size of an electric field is one obtained by dividing a voltage by the distance between the electrodes, there is a problem that a voltage required to generate an electric field for deflection increases with an increase in the distance between the electrodes. Therefore, when a KTN optical deflector is operated at a practical voltage on the order of several hundred V, the distance between electrodes cannot be increased, whereby damage is sometimes caused in application requiring great laser power such as material processing with a laser and rust-removing with a laser.

Embodiments of the present invention have been made in order to solve the above problem and has an object of providing an electro-optical device of which the electro-optic crystal is not damaged when laser light is input.

Means for Solving the Problem

An electro-optical device according to embodiments of the present invention includes: an electro-optic crystal having an incident surface and an emitting surface, incident light being made incident on the incident surface at an acute incident angle, the electro-optic crystal producing an electro-optic effect, wherein a rotation axis of an incident angle of the incident light is parallel to an electric field direction generated by voltage application, the incident light has power that causes breakage of the electro-optic crystal at a predetermined incident angle or less, and the incident light is made incident on the incident surface at an incident angle greater than an incident angle at which breakage of the electro-optic crystal is caused.

Effects of Embodiments of the Invention

According to embodiments of the present invention, incident light is made incident on an incident surface at an incident angle greater than an incident angle at which the breakage of an electro-optic crystal is caused as described above. Therefore, damage on the electro-optic crystal can be prevented when laser light is input.

DETAILED DESCRIPTION OF ILLUSTRATIVE EMBODIMENTS

Hereinafter, an electro-optical device according to an embodiment of the present invention will be described.

First, an examination result about the laser-light proof of an electro-optic crystal will be described. Hereinafter, the case of a light deflector using a crystal (KTN crystal) containing kalium, tantalum, and niobium as an electro-optic crystal will be described. An experiment for the examination will be described with reference to FIG. 1. First, a first electrode 102 and a second electrode 103 are formed on the two surfaces (3.2 mm×4 mm) of a rectangular-parallelepiped KTN crystal 101 of 3.2 mm×4 mm×1.2 mm. When an electro-optical device is used as the light deflector, the first electrode 102 and the second electrode 103 are made of an electrode material in which electrons are injected into the electro-optic crystal by the application of a direct current. As such an electrode material, titanium can be, for example, used. These electrodes are formed by vapor deposition. Further, the temperature of the KTN crystal 101 on which the first electrode 102 and the second electrode 103 were formed was controlled at a constant temperature so that the KTN crystal 101 had a capacitance of 1.47 nF (a relative dielectric constant of 15,565). In this temperature control, a Peltier element and a thermistor were used.

Figure 1:
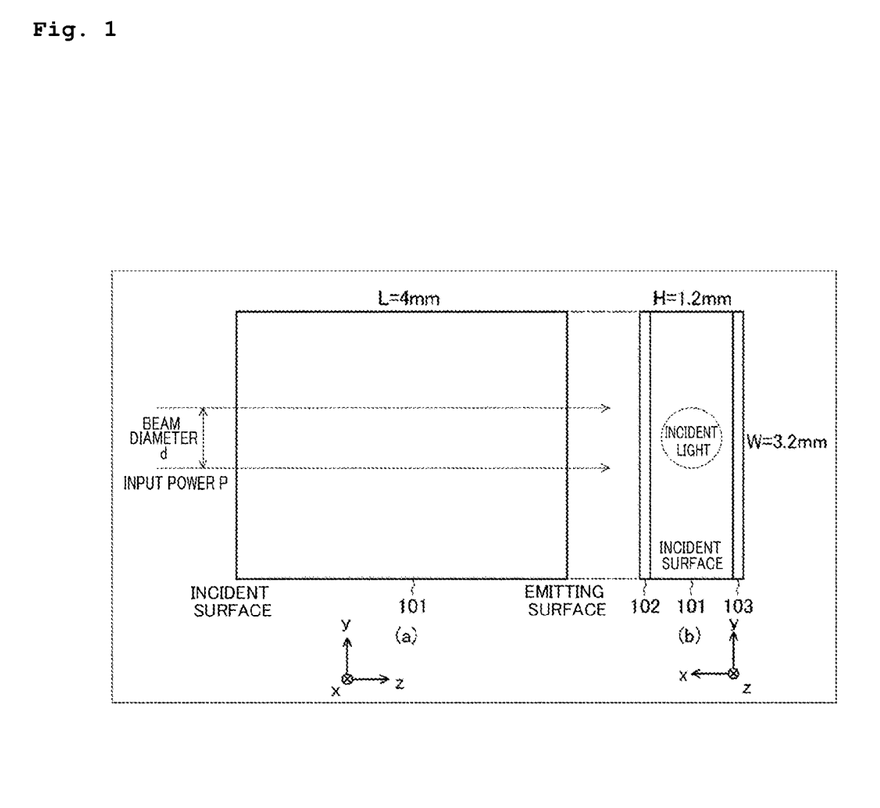
FIG. 1 is a configuration diagram for describing an examination method relating to the laser-light proof of an electro-optic crystal.

A light pulse from a Yb fiber laser light source (having a wavelength of 1.055 to 1.070 μm, a pulse repetition frequency of 50 kHz, and a pulse width of 180 ns) that performs multimode oscillation was perpendicularly made incident on the incident surface (of 3.2 mm×1.2 mm) of the KTN crystal 101. Note that a non-reflection film is formed on the incident surface by coating.

In order to make the KTN crystal 101 put in a stable state in a short period of time after the start of voltage application, incident light was deflected by applying an AC sine wave voltage (having a frequency of 1 kHz and a voltage amplitude of 300 V) about a DC bias voltage VDC of −250 V to the area between the first electrode 102 and the second electrode 103, while irradiating the KTN crystal 101 with the LED light that emits a purple color. A beam diameter was set at 48 μm on the incident surface of the KTN crystal 101, and the average power of a light source was increased to 1.44 W, 4.78 W, 10.41 W, 15.2 W, 20.9 W, 27.5 W, and 40.5 W.

Figure 2A:
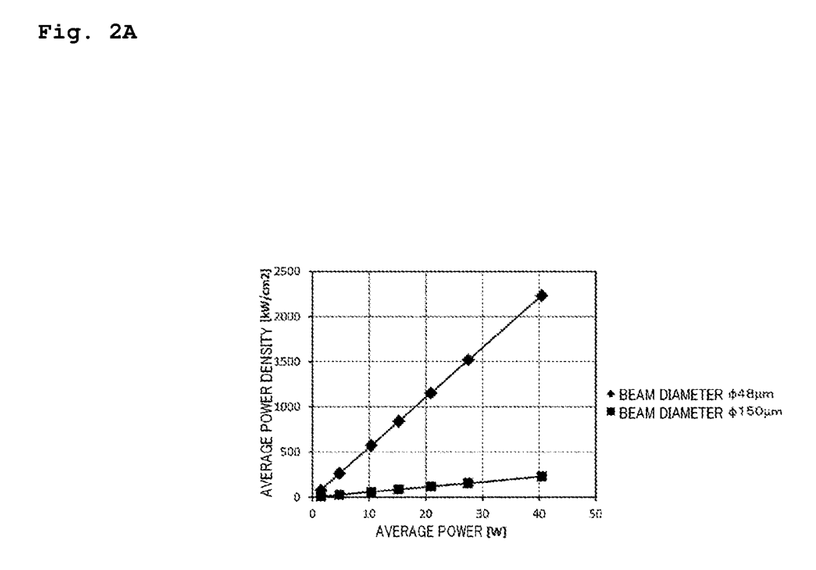
FIG. 2A is a characteristics diagram showing the calculated values of the dependence of the laser of incident light having average power density on average power.
Figure 2B:
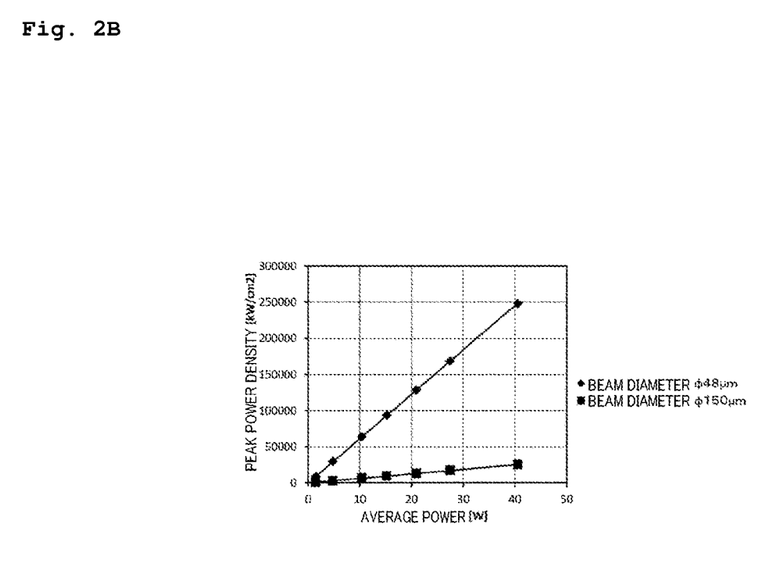
FIG. 2B is a characteristics diagram showing the calculated values of the dependence of the laser of incident light having peak power on the average power.

The calculated values of the dependence of the laser of incident light having average power density on the average power are shown in FIG. 2A. Further, the calculated values of the dependence of the laser of incident light having peak power density on the average power are shown in FIG. 2B. For the calculation of the calculated values, Formula (1), Formula (2), and Formula (3) were used. In an experiment using two light deflector samples, the KTN crystal 101 was damaged in one light deflector sample but was not damaged in the other light deflector sample when the light of 40.5 W was made incident on the two light deflector samples.

Next, the beam diameter was set at 150 μm on the incident surface of the KTN crystal 101, and the average power of the light source was increased to 1.44 W, 4.78 W, 10.41 W, 15.2 W, 20.9 W, 27.5 W, and 40.5 W. In an experiment using two light deflector samples, damage on the KTN crystal 101 was not found in both the light deflector samples.

In addition, a voltage was applied to the KTN crystal 101 with the temperature of the KTN crystal 101 reduced and controlled at a constant temperature so that the KTN crystal 101 had a capacitance of 1.56 nF (a relative dielectric constant of 16,518). The beam diameter was set at 150 μm on the incident surface of the KTN crystal 101, and the average power of the light source was similarly increased to 1.44 W, 4.78 W, 10.41 W, 15.2 W, 20.9 W, 27.5 W, and 40.5 W. In an experiment using four light deflector samples, damage on the KTN crystal 101 was not found in all the four light deflector samples.

These experimental results show that it is effective to reduce power density representing laser power per unit area to prevent damage on a KTN crystal in the KTN crystal to which a voltage is applied. That is, it is important to make the power density of light passing through the KTN crystal be less than a certain threshold (the limit power density of the light that is made incident on an incident surface at an incident angle of 0 to cause the breakage of an electro-optic crystal) to prevent damage on the KTN crystal.

Here, the threshold of the power density of the light causing damage can be freely determined by a user. For example, the threshold of the power density described above can be determined by preparing a light deflector using a plurality of KTN crystals, arranging measurement conditions such as an applied voltage and a dielectric constant, recording power density at which the KTN crystals are broken, and using the average value or the standard deviation of the power density. Further, the minimum value of the power density at which the KTN crystals are broken can be employed as the threshold of the power density described above.

Hereinafter, the electro-optical device according to the embodiment of the present invention will be described with reference to FIG. 3. The electro-optical device includes an electro-optic crystal 301, a first electrode 302, and a second electrode 303. Note that a voltage application mechanism that applies a voltage to the electro-optic crystal 301 with the first electrode 302 and the second electrode 303, a light source, or the like is omitted in FIG. 3. Further, although not shown in the figure, the electro-optic crystal 301 is controlled by a temperature measurement element such as a thermistor and a Peltier element so that its temperature does not change with time.

The electro-optic crystal 301 produces an electro-optic effect and has an incident surface 311 and an emitting surface 312. Incident light is made incident on the incident surface 311 at an acute incident angle. When the electro-optical device is a light deflector, the electro-optic crystal 301 deflects the incident light made incident on the incident surface 311 at the acute incident angle in an electric field direction in which a voltage is applied. The electro-optic crystal 301 can be composed of any of a KTN [$KTa_{1-\alpha}Nb_\alpha O_3$ ($0<\alpha<1$)] crystal or a KLTN [$K_{1-\beta}Li_\beta Ta_{1-\alpha}Nb_\alpha O_3$ ($0<\alpha<1$, $0<\beta<1$)] crystal to which lithium is added.

Here, the rotation axis of the incident angle of the incident light described above is parallel to the electric field direction. Further, the incident light has power that causes the breakage of the electro-optic crystal 301 at a predetermined incident angle or less and is made incident on the incident surface 311 at an incident angle greater than the incident angle at which the breakage of the electro-optic crystal 301 is caused.

The electro-optic crystal 301 has, for example, a rectangular parallelepiped shape. Here, it is assumed that the electro-optic crystal 301 having the rectangular parallelepiped shape has a length L, a width W, and a thickness H. A voltage is applied in the direction of the thickness H.

On the incident surface 311 having the width W and the thickness H of the electro-optic crystal 301, the light of power P that has a beam diameter (diameter) d is made incident. Here, a non-reflection film is formed on the incident surface 311. It is assumed that the incident angle of the light described above is θ. As shown in (a) of FIG. 3, the rotation axis of the incident angle θ is parallel to an x-axis, that is, a voltage application direction.

The light is refracted at the incident surface 311 according to the Snell's law. When it is assumed that the refractive index of the electro-optic crystal 301 is n and the refractive angle of the light is φ, $\sin \theta = n \sin \varphi$ is established.

The length (the diameter of the light) of a light irradiation area in a surface parallel to a yz surface in the incident surface 311 is expressed as d/cos θ. Further, the diameter of the light propagating through the electro-optic crystal 301 is expressed as d cos φ/cos θ. The light propagating through the electro-optic crystal 301 is refracted according to the Snell's law and output as the light having the beam diameter d at the emitting surface 312.

When the incident angle θ is greater than 0, the power density of the light reduces if the diameter d cos φ/cos θ of the light propagating through the electro-optic crystal 301 becomes greater than the beam diameter d. That is, if cos φ/cos θ>1 is established, the power density of the light propagating through the electro-optic crystal 301 reduces when compared with a case in which the incident angle θ is 0. This formula is established when the refractive index n is greater than 1.

The above will be described in further detail.

In order to establish cos φ/cos θ>1, $\cos^2 \varphi/\cos^2 \theta = (1-\sin^2 \varphi)/\cos^2 \theta = (1-\sin^2 \theta/n^2)/\cos^2 \theta > 1$ is only required to be obtained. When this formula is deformed, $n^2 \sin^2 \theta > \sin^2 \theta$ is obtained but is established when the incident angle θ is greater than 0 and the refractive index n is greater than 1. Accordingly, cos φ/cos θ>1 is established when the incident angle θ is greater than 0 and the refractive index n is greater than 1. Since the refractive index n of a substance is greater than 1, cos φ/cos θ is established at any time.

Figure 4:
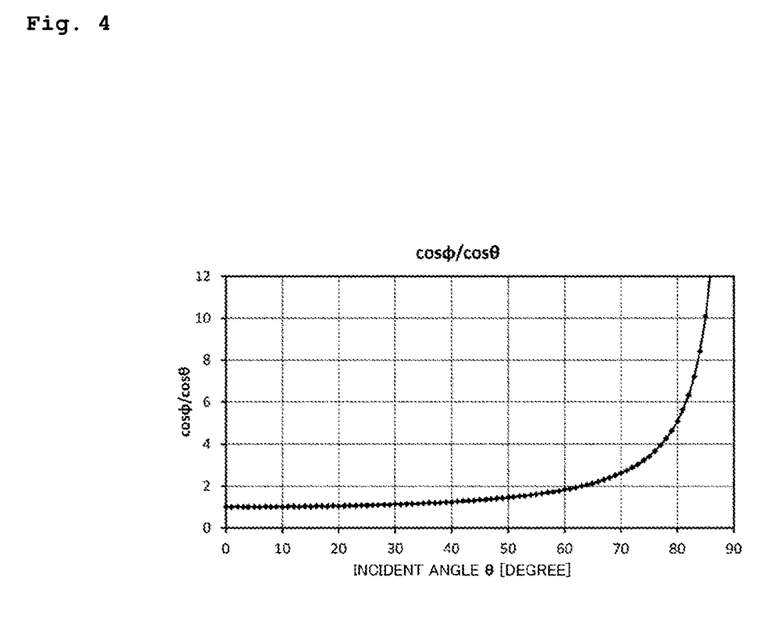
FIG. 4 is a characteristics diagram showing the dependence of a diameter $\cos\varphi/\cos\theta$ on an incident angle $\theta$ when the refractive index n of an electro-optic crystal 301 is 2.1 in the electro-optical device according to the embodiment of the present invention.

The dependence of the diameter cos φ/cos θ on the incident angle θ when the refractive index n is 2.1 is shown in FIG. 4. For example, when the incident angle θ is 60°, the diameter cos φ/cos θ becomes 1.82. When the incident angle θ is 64°, the diameter cos φ/cos θ becomes 2.06. When the incident angle θ is 73°, the diameter cos φ/cos θ becomes 3.05. When the incident angle θ is 80°, the diameter cos φ/cos θ becomes 5.09.

Figure 3:
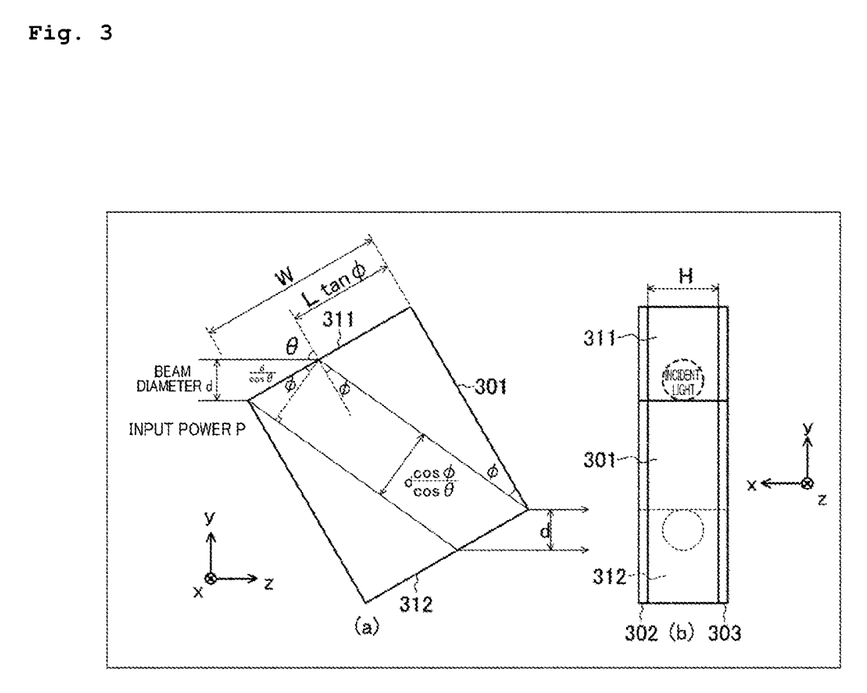
FIG. 3 is a configuration diagram showing the configuration of an electro-optical device according to an embodiment of the present invention.

Further, it is easily apparent from FIG. 3 that the width W of the electro-optic crystal 301 is d/cos θ+L tan φ or more. This is because a beam is kicked out at the emitting surface 312 when the width W is smaller than d/cos θ+L tan φ. Therefore, the minimum value Wmin of the width of the electro-optic crystal 301 is d/cos θ+L tan φ.

Figure 5:
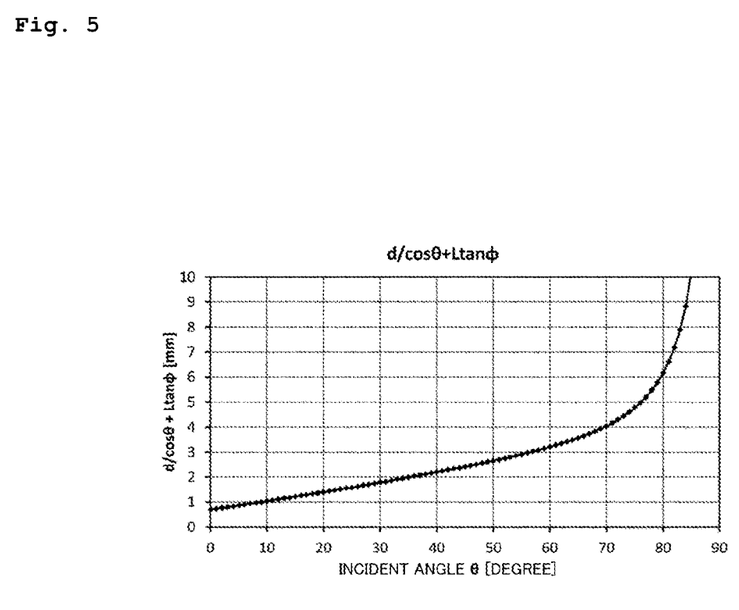
FIG. 5 is a characteristics diagram showing the dependence of a minimum value Wmin of the width of the electro-optic crystal 301 on the incident angle $\theta$.

As an example, the dependence of the minimum value Wmin on the incident angle θ when the refractive index n is 2.1, the beam diameter d is 0.7 mm, and the length L is 4 mm is shown in FIG. 5. When the incident angle θ is 60°, the minimum value Wmin is 3.21 mm. When the incident angle θ is 64°, the minimum value Wmin is 3.49 mm. When the incident angle θ is 73°, the minimum value Wmin is 4.44 mm. When the incident angle θ is 80°, the minimum value Wmin is 6.15 mm.

According to the embodiment described above, the power density of the light propagating through the electro-optic crystal can be reduced by the reciprocal of the diameter cos φ/cos θ compared with a case in which the incident angle θ is 0 without using a cylindrical lens or the like. Therefore, the risk of damage on the electro-optic crystal can be reduced. Note that the above description refers to a case in which the beam shape of the incident light is a circle having the beam diameter (diameter) d. However, the power density of the light propagating through the electro-optic crystal can be reduced regardless of the shape.

Figure 6:
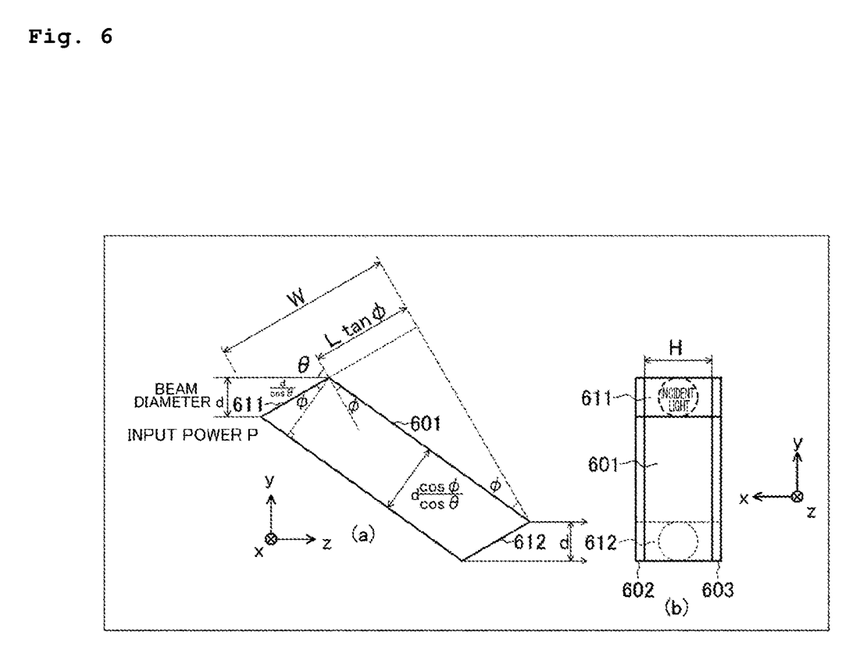
FIG. 6 is a configuration diagram showing the configuration of another electro-optical device according to the embodiment of the present invention.

Meanwhile, the electro-optic crystal is not required to be a rectangular parallelepiped. For example, as shown in FIG. 6, an electro-optic crystal 601 can be a structure that includes an incident surface 611 and an emitting surface 612 parallel to each other, and that has a parallelogram cross-sectional shape in a yz surface. The incident surface 611 and the emitting surface 612 can have an area within which a light beam falls. Further, the electro-optic crystal 601 can be constituted only by a portion through which light propagates. Thus, the volume of the electro-optic crystal 601 can be further reduced. Note that an emitting surface is not required to be parallel to an incident surface but propagating light is only required to be capable of being emitted from the emitting surface. For example, an emitting surface may be perpendicular to the traveling direction of light in an electro-optic crystal or may be slightly deviated from a perpendicular direction.

Note that when the electro-optical device according to the embodiment is an optical phase modulator, a first electrode and a second electrode are made of an electrode material in which the injection of electrons into an electro-optic crystal is blocked by the application of a DC voltage. As such an electrode material, platinum can be, for example, used. When the electro-optical device is an optical phase modulator, incident light is not deflected in an x-axis direction.

According to the present invention, incident light is made incident on an incident surface at an incident angle greater than an incident angle at which the breakage of an electro-optic crystal is caused as described above. Therefore, damage on the electro-optic crystal can be prevented when the laser light is input.

Note that the present invention is not limited to the embodiment described above but the implementation of many modifications and combinations are obviously made possible by persons having ordinary knowledge in the art within the technical scope of the present invention.

REFERENCE SIGNS LIST

301 Electro-optic crystal
302 First electrode
303 Second electrode
311 Incident surface
312 Emitting surface.

The invention claimed is:

1. An electro-optical device comprising:
an electro-optic crystal configured to produce an electro-optic effect when incident light is incident thereon; and
a voltage-applying mechanism configured to apply a voltage to the electro-optic crystal, wherein the electro-optic crystal is arranged such that the incident light is made incident on an incident surface of the electro-optic crystal at an acute incident angle, and wherein a rotation axis of the acute incident angle of the incident light is parallel to a direction of an electric field generated by the voltage-applying mechanism;
wherein the incident light is configured to have power that causes breakage of the electro-optic crystal when the incident light is incident on the incident surface at an incident angle which is a predetermined incident angle or less; and
the incident light is configured to be made incident on the incident surface at an incident angle greater than an incident angle at which breakage of the electro-optic crystal is caused.

2. The electro-optical device according to claim 1, wherein the voltage-applying mechanism includes a first electrode and a second electrode configured to apply a voltage to the electro-optic crystal.

3. The electro-optical device according to claim 1, wherein:
the electro-optic crystal is a KTN [$KTa_{1-\alpha}Nb_\alpha O_3$ ($0<\alpha<1$)] crystal.

4. The electro-optical device according to claim 1, wherein:
the electro-optic crystal is a KLTN [$K_{1-\beta}Li_\beta Ta_{1-\alpha}Nb_\alpha O_3$ ($0<\alpha<1$, $0<\beta<1$)] crystal.

5. The electro-optical device according to claim 1, wherein:
the electro-optic crystal constitutes an optical deflector configured to deflect the incident light in an electric field direction generated by voltage application.

6. The electro-optical device according to claim 1, wherein:
the electro-optic crystal constitutes an optical phase modulator that does not deflect incident light in an electric field direction generated by voltage application.

7. A method of operating an electro-optical device, the method comprising:
producing, by an electro-optic crystal, an electro-optic effect when incident light is incident thereon; and
applying, by a voltage-applying mechanism, a voltage to the electro-optic crystal, wherein the electro-optic crystal is arranged such that the incident light is made incident on an incident surface of the electro-optic crystal at an acute incident angle, and wherein a rotation axis of the acute incident angle of the incident light is parallel to a direction of an electric field generated by the voltage-applying mechanism;
wherein the incident light is configured to have power that causes breakage of the electro-optic crystal when the incident light is incident on the incident surface at an incident angle which is a predetermined incident angle or less; and
wherein the incident light is configured to be made incident on the incident surface at an incident angle greater than an incident angle at which breakage of the electro-optic crystal is caused.

8. The method according to claim 7, wherein the voltage-applying mechanism includes a first electrode and a second electrode configured to apply a voltage to the electro-optic crystal.

9. The method according to claim 7, wherein:
the electro-optic crystal is a KTN [$KTa_{1-\alpha}Nb_\alpha O_3$ ($0<\alpha<1$)] crystal.

10. The method according to claim 7, wherein:
the electro-optic crystal is a KLTN [$K_{1-\beta}Li_\beta Ta_{1-\alpha}Nb_\alpha O_3$ ($0<\alpha<1$, $0<\beta<1$)] crystal.

11. The method according to claim 7, wherein:
the electro-optic crystal constitutes an optical deflector configured to deflect the incident light in an electric field direction generated by voltage application.

12. The method according to claim 7, wherein:
the electro-optic crystal constitutes an optical phase modulator that does not deflect incident light in an electric field direction generated by voltage application.

\* \* \* \* \*